US008644112B1

(12) United States Patent
Sano et al.

(10) Patent No.: US 8,644,112 B1
(45) Date of Patent: Feb. 4, 2014

(54) FLASHER TYPE FISH SONAR

(75) Inventors: Shuichi Sano, Toyohashi (JP); Yoshiki Katayama, Toyohashi (JP)

(73) Assignee: Honda Electronics Co., Ltd., Aichi-ken (JP)

( * ) Notice: Subject to any disclaimer, the term of this patent is extended or adjusted under 35 U.S.C. 154(b) by 0 days.

(21) Appl. No.: 13/596,590

(22) Filed: Aug. 28, 2012

(51) Int. Cl.
*G01S 15/96* (2006.01)

(52) U.S. Cl.
USPC .......................................................... 367/109

(58) Field of Classification Search
USPC .......................................................... 367/109
See application file for complete search history.

(56) References Cited

U.S. PATENT DOCUMENTS 3,764,962 A * 10/1973 Bartel, Jr. ...................... 367/109

* cited by examiner

*Primary Examiner* — Daniel Pihulic
(74) *Attorney, Agent, or Firm* — Richard M. Goldberg

(57) ABSTRACT

A flasher type fish sonar includes a front case with a transparent display window, a signal transmitting element at a center thereof, a connecting base board having a first timing detecting portion mounted thereto, a signal receiving element mounted opposite the signal transmitting element, a receiving coil mounted at a periphery of the signal receiving element, a display LED attached opposite the display window, a display rotary disc having a second timing detecting portion mounted opposite the first timing detecting portion and near the display LED, an electric power transmitting coil mounted to the connecting base board opposite the receiving coil, a main base board fixed to the connecting base board and a motor on the main base board for rotating the display rotary disc, such that a a water surface, reflected echos of fishes and a water bottom of the sea are displayed in the display window.

4 Claims, 5 Drawing Sheets

FLASHER TYPE FISH SONAR

BACKGROUND OF THE INVENTION

The present invention relates to a flasher type fish sonar having a light emitting diode for displaying, a receiving portion for receiving display signals, a rotary disk position detecting portion, and a power receiving coil mounted on the rotary disk.

In prior flasher type fish sonar, a display disk comprises a circular window formed at a front of a case, and a luminous body is mounted to a rotary disk opposite to the circular window. The rotary disk is rotated by a motor, slip rings are attached to a rotary shaft of the rotary disk, and brushes contact the slip rings. An input circuit is connected to the brushes, a control circuit is connected to the input circuit, and an oscillating circuit and a receiving circuit are connected to the control circuit and an ultrasonic transducer.

When oscillating signals are input from the control circuit to the oscillating circuit, oscillating outputs are input from the oscillating circuit to the ultrasonic transducer, and ultrasonic waves are emitted from the ultrasonic vibrator to the water. Reflected ultrasonic waves from the water are received by the ultrasonic transducer, and reflected signals from the ultrasonic transducer are amplified by the receiving circuit and are input from the control circuit to the input circuit. By the reflected signals applied to the input circuit, luminous power is input to the luminous body through the brushes and slip rings from the input circuit. A portion A displayed on the circular window is a start point of a luminosity which shows a surface of the sea, portion B shows fishes, a portion C shows a first bottom echo of the sea, and a portion D shows a second bottom echo of the sea.

In the prior flasher type fish sonar, because power and display signals are supplied by brushes and slip rings, a large vibration and noise are generated and brushes are worn by the wear.

SUMMARY OF THE INVENTION

It is, therefore, the primary object of the present invention to provide a flasher type fish sonar in which the display signals and the electric power are transmitted to a device without using brushes and slip rings.

It is another object of the present invention to provide a flasher type fish sonar in which vibrations and noises are not generated by brushes and the slip rings.

In order to accomplish the above and other objects, the present invention comprises a front case forming a display transparent window in a front and having a signal transmitting element in a center of the front, a display rotating disc attaching a signal receiving element opposite to the signal transmitting element in the center, a power receiving coil at a periphery of the signal receiving element, a display light emitting diode attached to the position opposite to the display window of the front case, and a first timing detecting portion near the display light emitting diode, a connecting base board having a power transmitting coil opposite to the power receiving coil and a second timing detecting portion opposite to the first timing detecting portion, a main base board fixed to the connecting base board, a motor having a rotary shaft fixed to the display rotary disk through holes of the connecting base board and the main base board, and therefore, a start line being displayed as A, an echo of fishes as B, a sea bottom (a first sea bottom echo) as C, and a sea bottom (a second sea bottom echo) as D on the display window by the display rotary disc rotated by the motor.

DESCRIPTION OF THE PREFERRED EMBODIMENT

Figure 1:
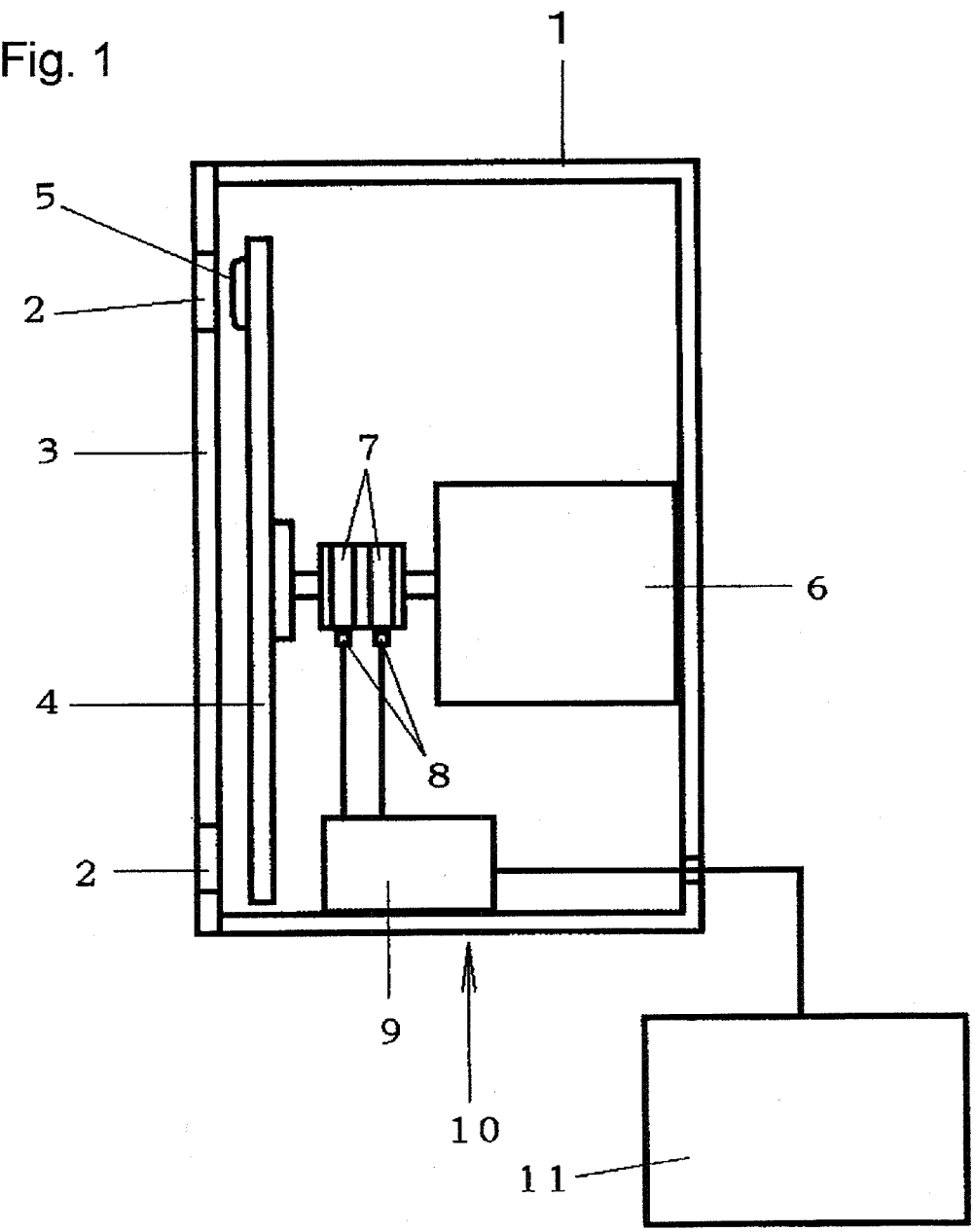
FIG. 1 shows a sectional view of a prior flasher type fish sonar.
Figure 2:
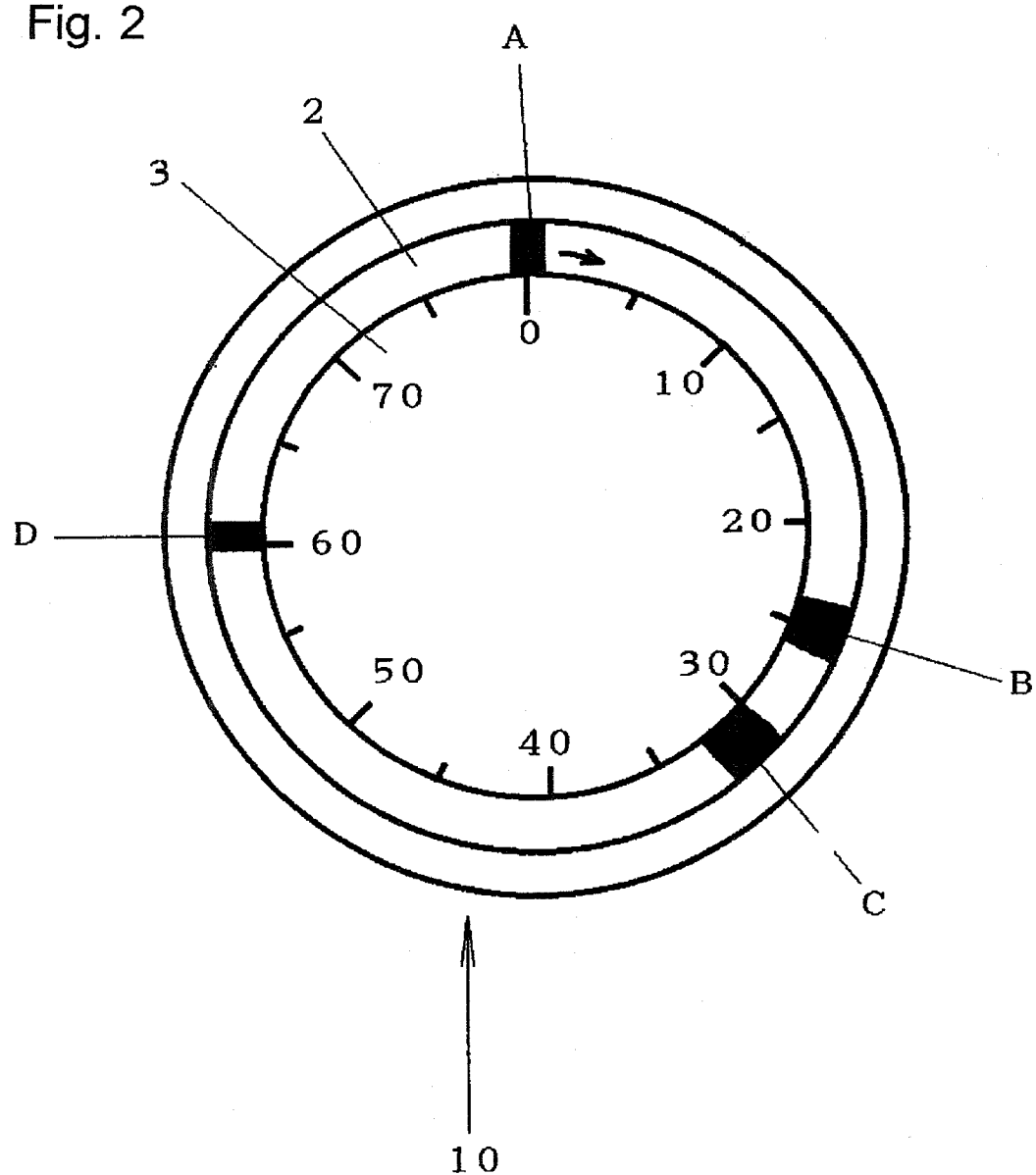
FIG. 2 shows a front plan view of a display portion of the flasher type fish sonar in FIG. 1.

In a prior flasher type fish sonar, as shown in FIG. 1 and FIG. 2, a display board 3 with a window 2 is formed at a front of a case 1, and a luminous body 5 is attached to a rotary disk 4 opposite to the window 2. The rotary disk 4 is rotated by a motor 6, and slip rings 7 fixed to a rotary shaft of the rotary disk 4 are contacted with brushes 8 connected to an input circuit 9. A display device 10 is constructed by the above constructions and a transmitting and receiving device 11 is connected to the display device 10.

When signals are input from a transmitting and receiving device 11, light emitting power is input to the luminous body 5 through the brushes 8 and slip rings 7 from the input circuit 9. As shown in FIG. 2, a portion A on the window 2 becomes the start point of the light of the luminous body 5 for showing the surface of the sea, a portion B shows fishes, a portion C shows a first reflection of the echo of the sea bottom, and a portion D shows a second reflection of the echo of the sea bottom.

In the prior flasher type fish sonar, because power and display signals are supplied by brushes and slip rings, a large vibration and noise are generated and the brushes are worn by their wear.

Figure 3:
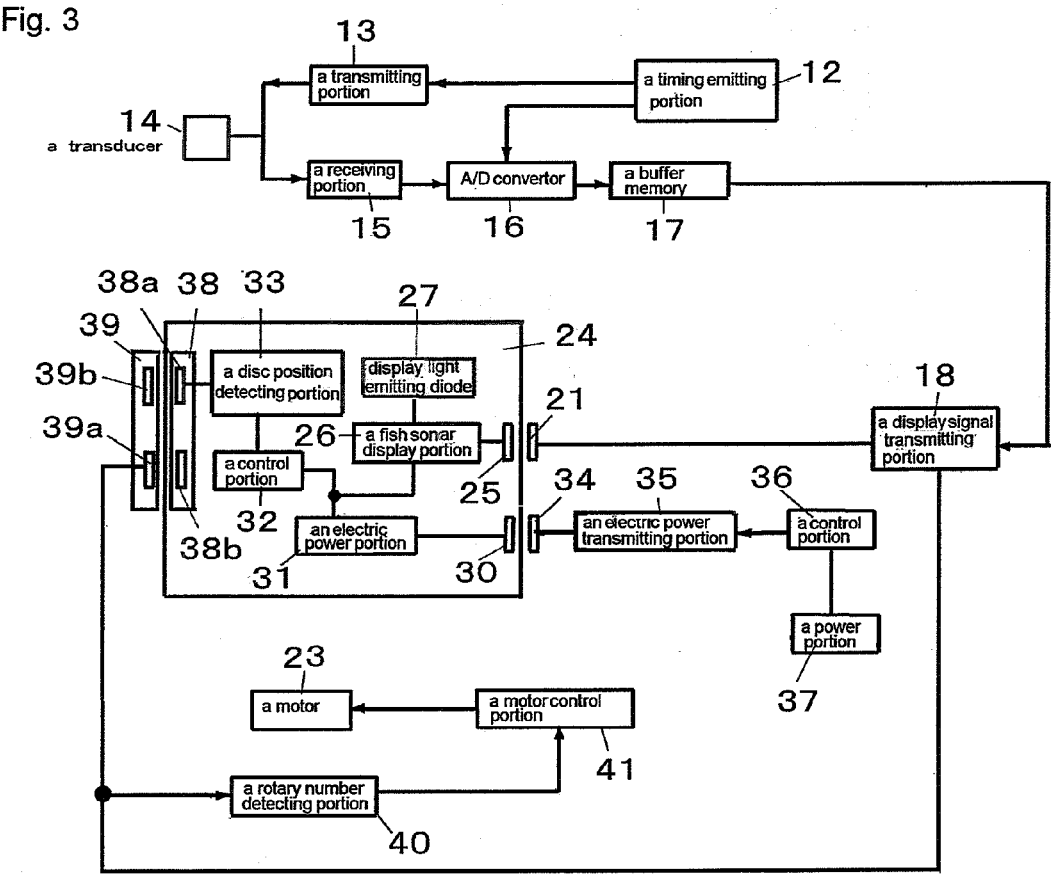
FIG. 3 shows a block diagram of a flasher type fish sonar of the present invention.

FIG. 3 shows a block diagram of a flasher type fish sonar of the present invention, when timing signals are transmitted from a timing generating or emitting portion 12 to a transmitting portion 13, and oscillating signals are output from transmitting portion 13 to a transducer 14. Ultrasonic vibrations are emitted from the transducer 14 to the water, and therefore, reflected signals are reflected from objects in the water, living things and a bottom of water and are input to a receiving portion 15. The reflected signals input to the receiving portion 15 are amplified, converted to digital signals by an A/D convertor 16, and stored in a buffer memory 17 once.

Figure 4:
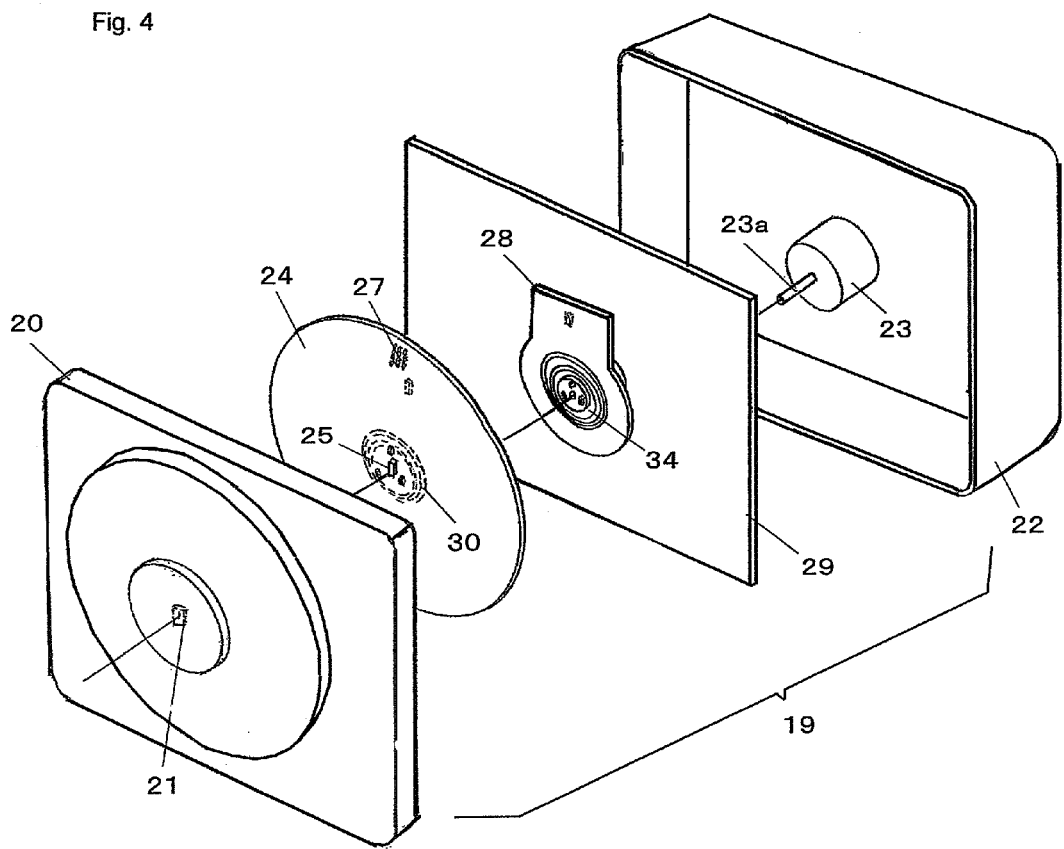
FIG. 4 shows a perspective, blown apart view of the flasher type fish sonar in FIG. 3.
Figure 5:
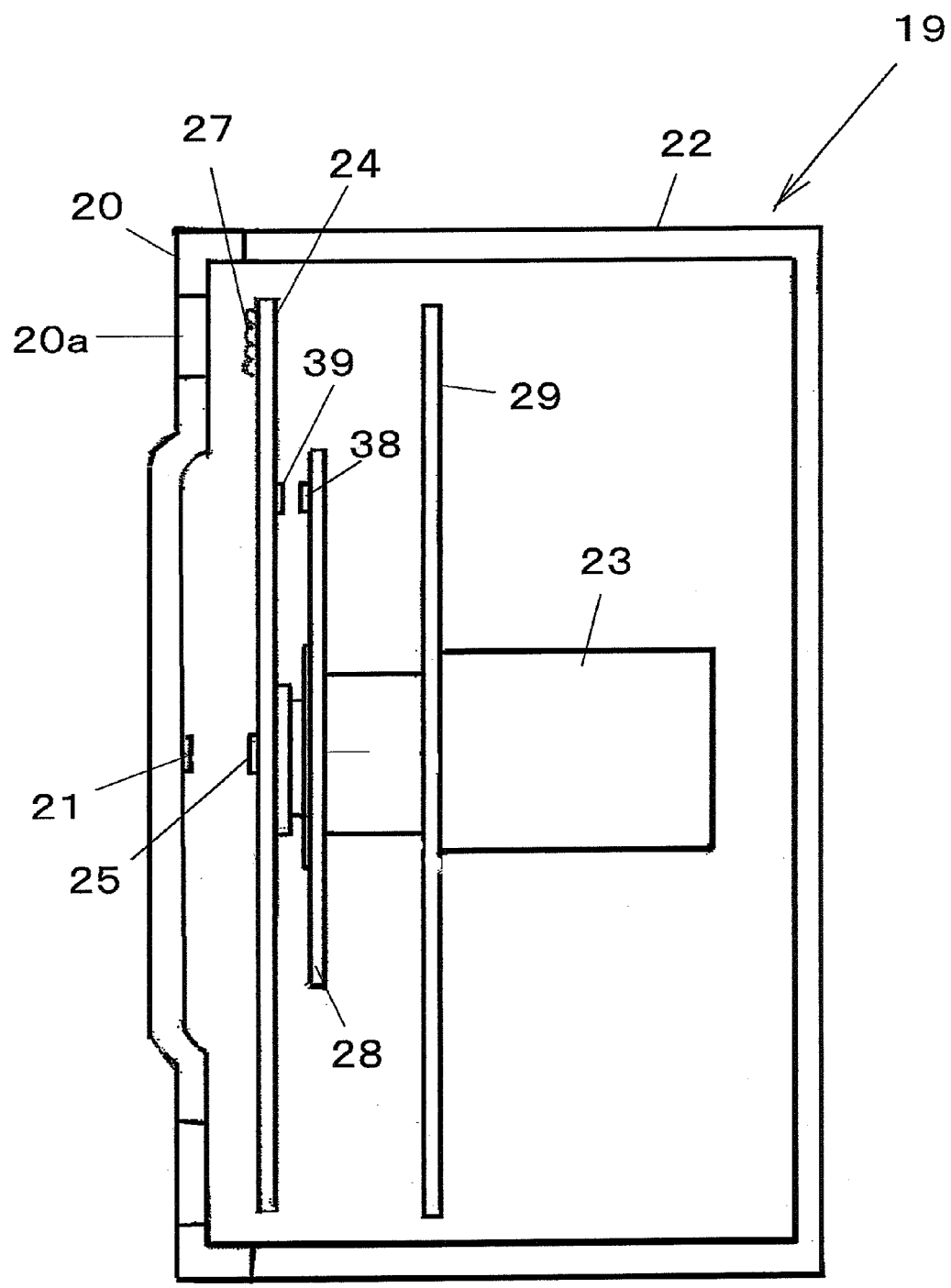
FIG. 5 shows a side sectional view of the flasher type fish sonar in FIG. 3.

The reflected signals read from the buffer memory 17 are input to a display signal transmitting portion 18. The output signals of the display signal transmitting portion 18 are input to a signal transmitting element 21 attached on a center of a front case 20 in a display device 19 as shown in FIGS. 4 and 5. Light emitting signals output from signal transmitting element 21 are input to a signal receiving element 25 of a rotary display disc 24 which is fixed on a rotary shaft 23a of a motor 23 attached to a main base board 29. Receiving signals from signal receiving element 25 are input to a fish sonar display portion 26 and emitted to a display light emitting diode 27 attached to rotary display disc 24 in front of a display window 20a of front case 20.

A connecting base board 28 opposite to the rotary display disk 24 is attached to the main base board 29. A power receiving coil 30 is attached to the periphery of signal receiving element 25 and electric power is supplied to a power portion 31 by the power receiving coil 30. Electric power is supplied from the power portion 31 to a control portion 32 and a fish sonar display portion 26. The power receiving coil 30 is attached opposite to a power transmitting coil 34 mounted the connecting base board 28. The power transmitting coil 34 is connected to a power transmitting portion 35 as shown in FIG. 3. The power transmitting portion 35 is connected to a control portion 36 which is connected to a power portion 37 in the device. A light receiving element 38a and a light emitting element 38b of a first timing detecting portion 38 are mounted to the connected base board 28, and a light receiving element 39a and a light emitting element 39b of a second timing detecting portion 39 are attached to each other. A disc position detecting portion 33 is connected between control portion 32 and first timing detecting portion 38. The output of the light receiving element 38a of the first timing detecting portion 38 is detected by a rotation number detecting portion 40 as shown in FIG. 3. The detecting signals from the rotation number detecting portion are input to a motor control portion 41, the signals from the motor control portion 41 are input to motor 23, and thereby, the rotation number of motor 23 is controlled to a predetermined rotation number.

In the flasher type fish sonar in the present invention, after reflected signals of the ultrasonic waves emitted in water from the transducer are stored in the buffer memory 17, the reflected signals are read from the buffer memory 17 by the timing signals from the light receiving element 38, and the reflected signals read from the buffer memory 17 are input the signal transmitting element 21 from the display signal transmitting portion 18. Therefore, light signals according to the strength of the reflected signals are input to the signal receiving element 25, receiving signals are input to a fish sonar display portion 26 and emitted to the display light emitting diode 27. As shown in FIG. 2, starting line A is shown in the upper portion in the display window 20a, the echo B of fishes is shown next, the bottom of water C (the first reflected waves) is shown next, and the bottom of water D (the second reflected waves) is shown next.

The reflected signals from the main base board 29 to the display rotary disc 24 are received and transmitted by the light signal, the supply of the electric power is done by the transmitting coil 34 and the receiving coil 30, and the position detect of the display rotary disc 24 is done by the first timing detecting portion 38 having the light receiving element 38a and the light emitting element 38b mounted the display rotary disc 24 and the second timing detecting portion 39 having the light receiving element 39a and the light emitting element 39b mounted to the connected base board 28. Therefore, because no contact portion such as a brush or a slip ring is mounted for transmitting the signals and the electric power, vibration or noise are not generated in the device, and the device has a long life as wear is not present.

What is claimed is:

1. A flasher type fish sonar comprising:
    a front case having a transparent display window at a front portion thereof,
    a signal transmitting element attached to a center of the front case,
    a connecting base board in the front case,
    a first timing detecting portion mounted to the connecting base board,
    a signal receiving element attached to a center position opposite to the signal transmitting element,
    a receiving coil mounted at a periphery of the signal receiving element,
    a display light emitting diode attached opposite to the display window of the front case,
    a display rotary disc in which a second timing detecting portion is attached opposite to the first timing detecting portion and near the display light emitting diode,
    an electric power transmitting coil mounted to the connecting base board opposite to the receiving coil,
    a main base board to which the connecting base board is fixed, and
    a motor fixed the main base board and having a rotary shaft to which the display rotary disc is fixed and extending through a center passing hole of the connected base board and the main base board, such that the display rotary disc is rotated by the motor, and
    wherein a starting line showing a water surface and reflected echos of fishes and a water bottom of the sea are displayed in the display window of the front case.

2. A flasher type fish sonar as set forth in claim 1, wherein the signal transmitting element is a light emitting body, and the signal receiving element is a light receiving body.

3. A flasher type fish sonar as set forth in claim 1, wherein the first and second timing detecting portions are two light emitting elements and two light receiving elements opposite to each other.

4. A flasher type fish sonar as set forth in claim 1, wherein an infrared ray light emitting diode is used in the signal transmitting element and one of photodiode and a phototransistor is used in the light emitting element.

\* \* \* \* \*